(12) United States Patent
Balash

(10) Patent No.: US 8,393,461 B2
(45) Date of Patent: Mar. 12, 2013

(54) CAR WASH ROLLER ASSEMBLY AND METHOD FOR MANUFACTURING THE CAR WASH ROLLER ASSEMBLY

(75) Inventor: Andrew Vaughan Balash, St. Clair Shores, MI (US)

(73) Assignee: Vaughan Industries Inc., Detroit, MI (US)

( * ) Notice: Subject to any disclaimer, the term of this patent is extended or adjusted under 35 U.S.C. 154(b) by 202 days.

(21) Appl. No.: 13/100,607

(22) Filed: May 4, 2011

(65) Prior Publication Data

US 2012/0279004 A1    Nov. 8, 2012

(51) Int. Cl.
*B65G 19/26* (2006.01)

(52) U.S. Cl. ................................ 198/732; 104/172.3

(58) Field of Classification Search ............ 198/732, 198/721, 729, 835; 193/35 R, 37; 104/172.1, 104/172.3, 102, 105, 162, 164, 165
See application file for complete search history.

(56) References Cited

U.S. PATENT DOCUMENTS

| | | |
|---|---|---|
| 2,511,684 A | 6/1950 | Amore |
| 2,806,236 A | 9/1957 | Stefano |
| 3,274,632 A | 9/1966 | Franklin |
| 3,305,144 A | 2/1967 | Beres et al. |
| 3,331,093 A | 7/1967 | Mayden |
| 3,381,335 A | 5/1968 | Schaedlich et al. |
| 3,596,605 A | 8/1971 | Shelstad |
| 3,760,447 A | 9/1973 | Vivion |
| 3,784,063 A | 1/1974 | Otis et al. |
| 3,989,390 A | 11/1976 | Thorner |
| 4,126,401 A | 11/1978 | Stoyshin |
| 4,168,560 A | 9/1979 | Doyel |
| 4,290,442 A | 9/1981 | Shaffer |
| 4,350,299 A | 9/1982 | Stephenson et al. |
| 4,413,785 A | 11/1983 | Engelbert et al. |
| 4,552,476 A | 11/1985 | Heraty et al. |
| 4,636,102 A | 1/1987 | Drake |
| 4,690,065 A * | 9/1987 | Belanger et al. ........... 104/172.3 |
| 4,715,287 A | 12/1987 | Wentworth et al. |
| 4,848,384 A | 7/1989 | Christopher et al. |
| 4,848,946 A | 7/1989 | Goncalves |
| 4,864,936 A | 9/1989 | Rietsch, Jr. |
| 4,873,929 A | 10/1989 | Witecki |
| 4,930,424 A | 6/1990 | Astley |
| 4,938,621 A | 7/1990 | Pyrozyk |
| 4,974,984 A | 12/1990 | Kafkis et al. |
| 5,140,910 A * | 8/1992 | Welter ....................... 104/172.3 |
| 5,184,909 A | 2/1993 | Schaefer |
| 5,547,303 A | 8/1996 | Pyrozyk |
| 5,567,073 A | 10/1996 | de Laforcade et al. |
| 5,641,233 A | 6/1997 | Wilson |
| 5,977,050 A | 11/1999 | Faris |

(Continued)

*Primary Examiner* — James R Bidwell
(74) *Attorney, Agent, or Firm* — Buckert Patent & Trademark Law Firm, P.C.; John F. Buckert

(57) ABSTRACT

A car wash roller assembly is provided. The assembly includes a metal frame member having a body portion and an extension portion. The body portion has a first aperture having a shaft disposed therethrough. The assembly further includes first and second plastic cover members holding the body portion therebetween. The first plastic cover member has a second aperture, and the second plastic cover member has a third aperture for receiving the shaft therethrough. The assembly further includes first and second plastic sleeves disposed over first and second portions of the shaft, and first and second plastic wheels rotatably coupled to the sleeves. The first plastic cover member restricts movement of the chain link in a first direction relative to the metal frame member.

12 Claims, 17 Drawing Sheets

U.S. PATENT DOCUMENTS

| | | |
|---|---|---|
| 6,048,583 A | 4/2000 | Waddell |
| 6,186,073 B1 | 2/2001 | Reitsch, Jr. |
| 6,647,894 B1 | 11/2003 | Simoes |
| 6,668,731 B2 | 12/2003 | Calisi et al. |
| 7,530,317 B1 | 5/2009 | Belanger et al. |
| 8,146,511 B1 * | 4/2012 | Analetto .................... 104/172.3 |
| 8,161,888 B2 * | 4/2012 | Balash ...................... 104/172.3 |
| 2002/0066389 A1 | 6/2002 | Rietsch, Jr. |
| 2003/0200892 A1 | 10/2003 | Calisi et al. |
| 2004/0221878 A1 | 11/2004 | Johnson |
| 2006/0191773 A1 | 8/2006 | Horn |
| 2006/0225601 A1 | 10/2006 | Belanger et al. |
| 2007/0284223 A1 | 12/2007 | Belanger et al. |
| 2008/0229965 A1 | 9/2008 | Balash |
| 2011/0036263 A1 | 2/2011 | Balash |

* cited by examiner

CAR WASH ROLLER ASSEMBLY AND METHOD FOR MANUFACTURING THE CAR WASH ROLLER ASSEMBLY

BACKGROUND

Car wash rollers have been utilized in car wash conveyor systems. Generally, a car wash roller has a body, wheels, and a chain link. The chain link is coupled to the body of the car wash roller, and is further coupled to a conveyor system that moves the car wash roller. After extended use, a coupling between the chain link and the body of the car wash roller can become loose resulting in undesired movement of the chain link relative to the body. The undesired movement of the carrier can degrade the body of the car wash roller.

Accordingly, the inventor herein has recognized a need for an improved car wash roller assembly and an improved method of manufacturing the car wash roller assembly that minimizes and/or eliminates the above-identified deficiencies.

SUMMARY

A car wash roller assembly for attachment to a chain link of a car wash conveyor system, in accordance with an exemplary embodiment is provided. The car wash roller assembly includes a metal frame member having a body portion and an extension portion extending from the body portion. The body portion has a first aperture extending therethrough. The car wash roller assembly further includes a shaft configured to be disposed through the first aperture. The shaft is coupled to the metal frame member. The car wash roller assembly further includes first and second plastic cover members configured to hold the body portion of the metal frame member therebetween such that the extension portion extends outwardly from the first and second plastic cover members. The first plastic cover member has a second aperture extending therethrough for receiving the shaft therethrough. The second plastic cover member has a third aperture extending therethrough for receiving the shaft therethrough. The car wash roller assembly further includes first and second plastic sleeves that are disposed over first and second portions, respectively of the shaft. The car wash roller assembly further includes first and second plastic wheels that are rotatably coupled to the first and second plastic sleeves, respectively. The extension portion of the metal frame member is configured to be coupled to the chain link, and the first plastic cover member defines a surface configured to contact a portion of a peripheral surface of the chain link to restrict movement of the chain link in a first direction relative to the metal frame member.

A method of manufacturing a car wash roller assembly in accordance with another exemplary embodiment is provided. The method includes disposing a shaft through a first aperture of a metal frame member. The method further includes welding the shaft to the metal frame member utilizing a welding device. The metal frame member has a body portion and an extension portion extending from the body portion. The method further includes disposing first and second plastic cover members on first and second sides, respectively, of the metal frame member such that the body portion is held therebetween and the extension portion extends outwardly from the first and second plastic cover members. The first plastic cover member has a second aperture extending therethrough for receiving the shaft therethrough. The second plastic cover member has a third aperture extending therethrough for receiving the shaft therethrough. The method further includes disposing first and second plastic sleeves over first and second portions, respectively, of the shaft. The method further includes rotatably coupling first and second plastic wheels to the first and second plastic sleeves, respectively.

A method of replacing a plastic sleeve in a car wash roller assembly in accordance with another exemplary embodiment is provided. The method includes unscrewing a bolt from a threaded aperture in an end portion of a shaft of the car wash roller assembly such that the bolt and an adjacent washer are decoupled from the car wash roller assembly. The method further includes removing first and second plastic wheels from a plastic sleeve that is disposed on the shaft. The method further includes disposing the plastic sleeve off of the shaft. The method further includes disposing a new plastic sleeve on the shaft. The method further includes disposing the first and second plastic wheels on the new plastic sleeve. The method further includes screwing the bolt into the threaded aperture in the end portion of the shaft such that the adjacent washer contacts an end of the new plastic sleeve and does not contact an end of the shaft such that the new plastic sleeve is prevented from rotating relative to the shaft.

DESCRIPTION OF EXEMPLARY EMBODIMENTS

Figure 1:
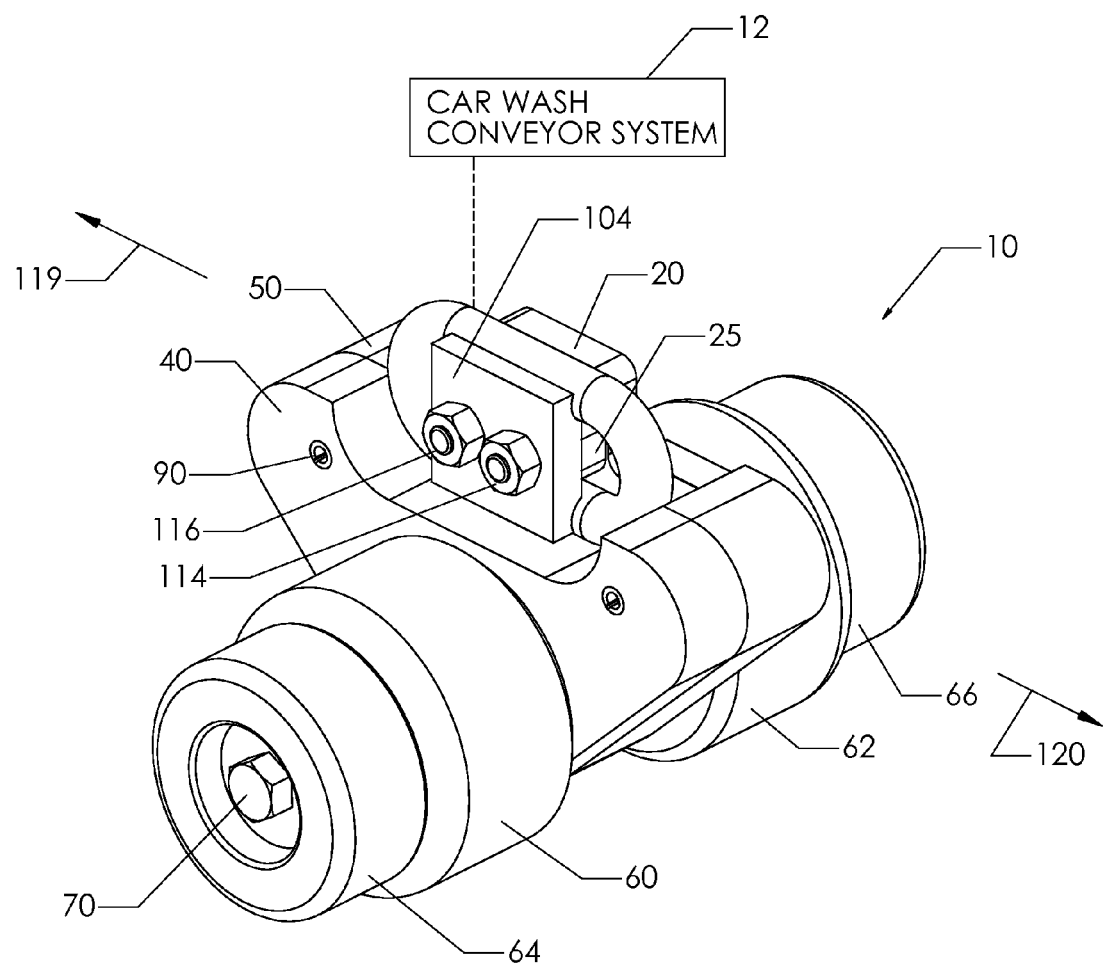
FIG. 1 is a schematic of a car wash roller assembly in accordance with an exemplary embodiment.

Referring to FIGS. 1-8, a car wash roller assembly 10 that is configured to hold a vehicle wheel thereon for moving the vehicle in a car wash conveyor system 12, in accordance with an exemplary embodiment is illustrated. The car wash conveyor system 12 includes a chain link 102. The car wash roller assembly 10 includes a metal frame member 20, a spacing plate 25, a shaft 30, first and second plastic cover members 40, 50, first and second plastic sleeves 52, 54, first, second, third, and fourth plastic wheels 60, 62, 64, 66, first and second bolts 70, 72, first and second washers 80, 82, first and second dowel pins 90, 92, a back plate 104, bolts 110, 112, and nuts 114, 116. An advantage of the car wash roller assembly 10 is that the assembly 10 utilizes the plastic sleeves 50, 52 that constrain movement of the chain link 102 in a first direction 119 and a second direction 120. As a result, the car wash roller assembly 10 has a longer operational life is compared to other car wash roller assemblies.

Referring to FIGS. 2, 3, 6 and 7, the metal frame member 20 is configured to be coupled to the chain link 102 and to the shaft 30. The metal frame member 20 includes a body portion 130 and an extension portion 132 extending from the body portion 130. In one exemplary embodiment, the body portion 130 is generally triangular-shaped, and the extension portion 130 is generally rectangular-shaped. Of course, in alternative embodiments, the body portion 130 and the extension portion 132 could have other shapes known to those skilled in the art. The body portion 130 includes apertures 140, 146, 148 extending therethrough. The aperture 140 is configured to receive the shaft 30 therethrough. The apertures 146, 148 are configured to receive the first and second dowel pins 90, 92, respectively, therethrough. The extension portion 130 includes apertures 151, 152 extending therethrough. The apertures 151, 152 are configured to receive the bolts 110, 112, respectively, therethrough. In one exemplary embodiment, the metal frame member 20 is constructed of steel. Of course, in alternative embodiments, the metal frame member 20 could be constructed of other metals known to those skilled in the art, such as aluminum, titanium, or stainless steel for example.

The spacing plate 25 is coupled to the extension portion 132 of the metal frame member 20. In one exemplary embodiment, the spacing plate 25 is welded to the metal frame member 20 utilizing a welding device 249 (see FIG. 18). The spacing plate 25 is configured to be received within a central open region 310 of the chain link 102. The spacing plate 25 includes apertures 156, 158 extending therethrough and align with the apertures 151, 152, respectively, of the metal frame member 20.

Figure 2:
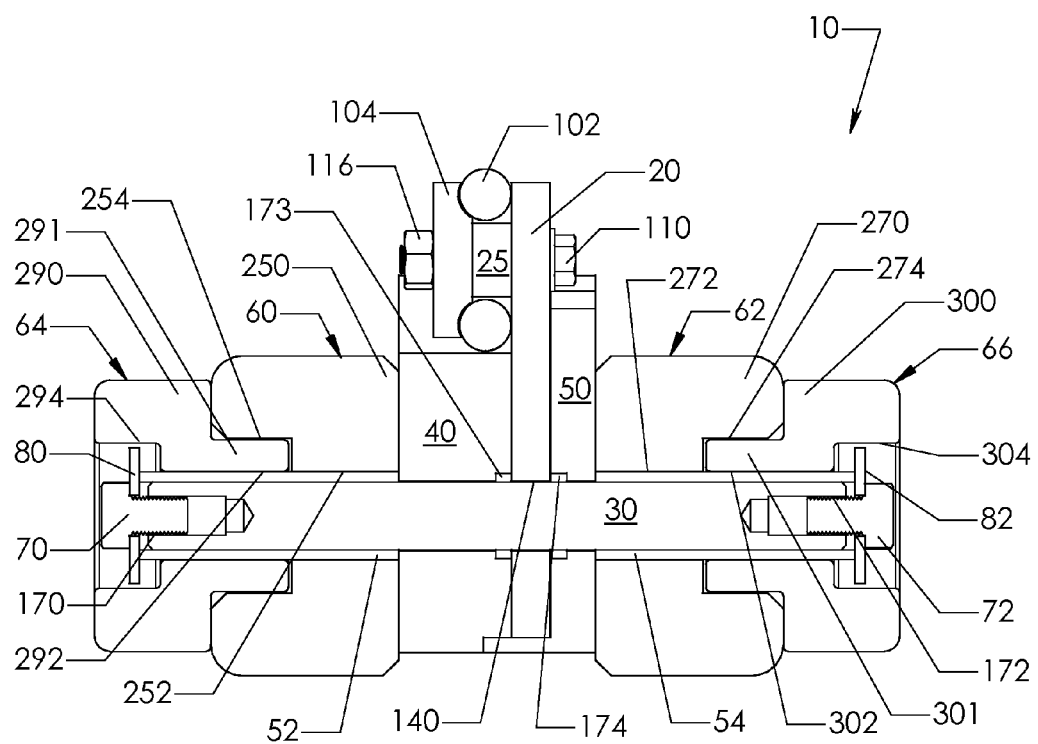
FIG. 2 is a cross-sectional schematic of the car wash roller assembly of FIG. 1.
Figure 3:
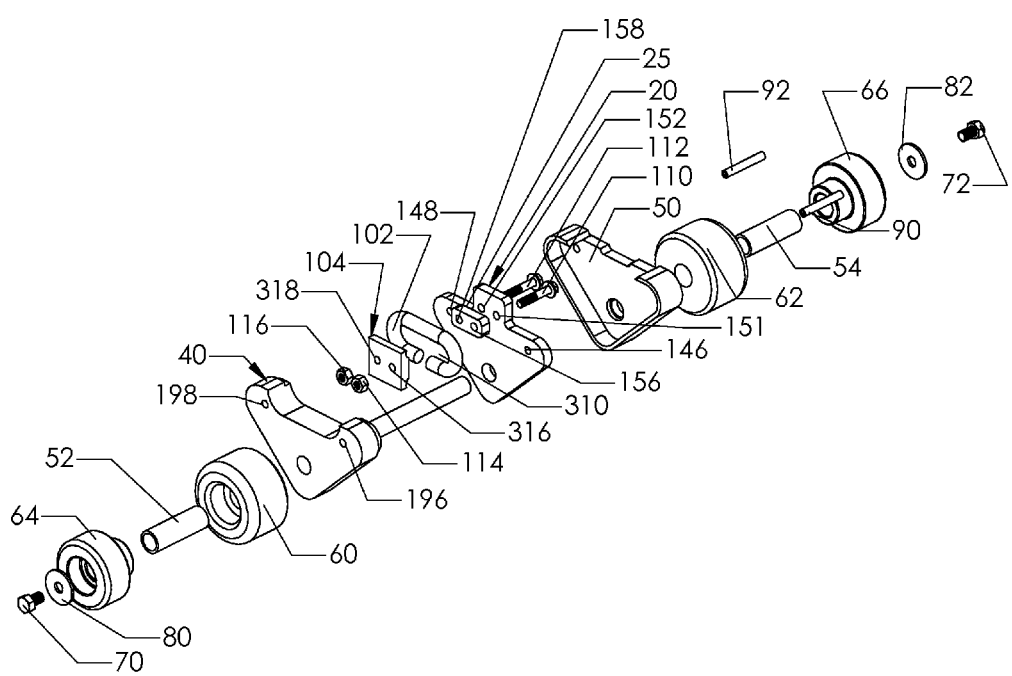
FIG. 3 is an exploded view of the car wash roller assembly of FIG. 1.
Figure 5:
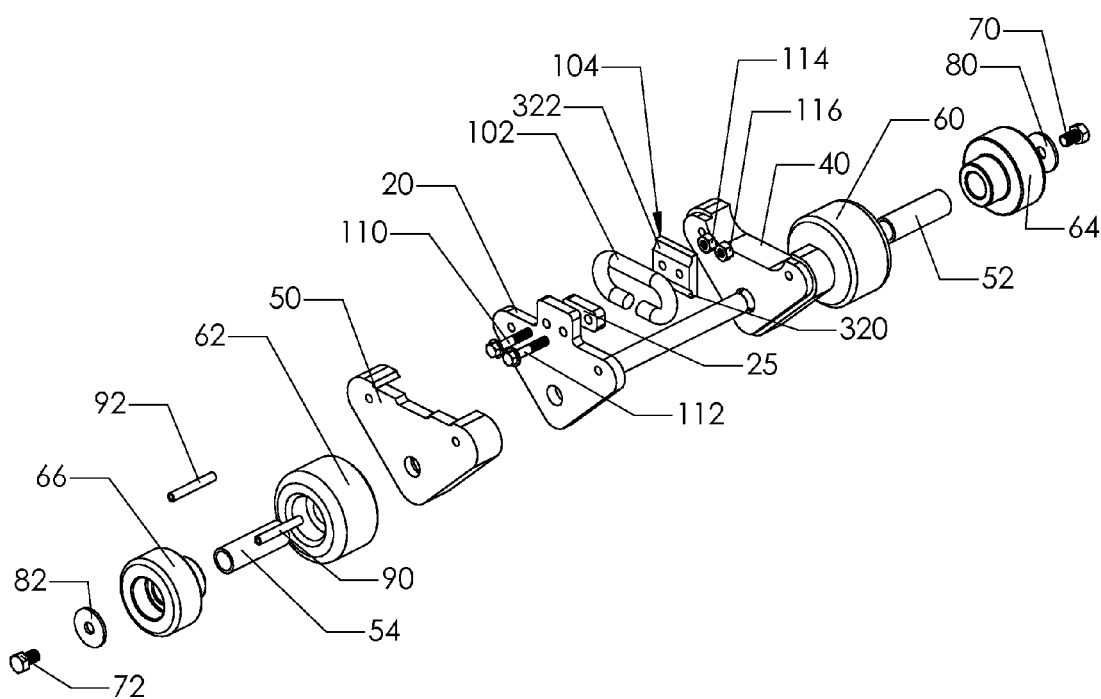
FIG. 5 is another cross-sectional schematic of the car wash roller assembly of FIG. 1.
Figure 6:
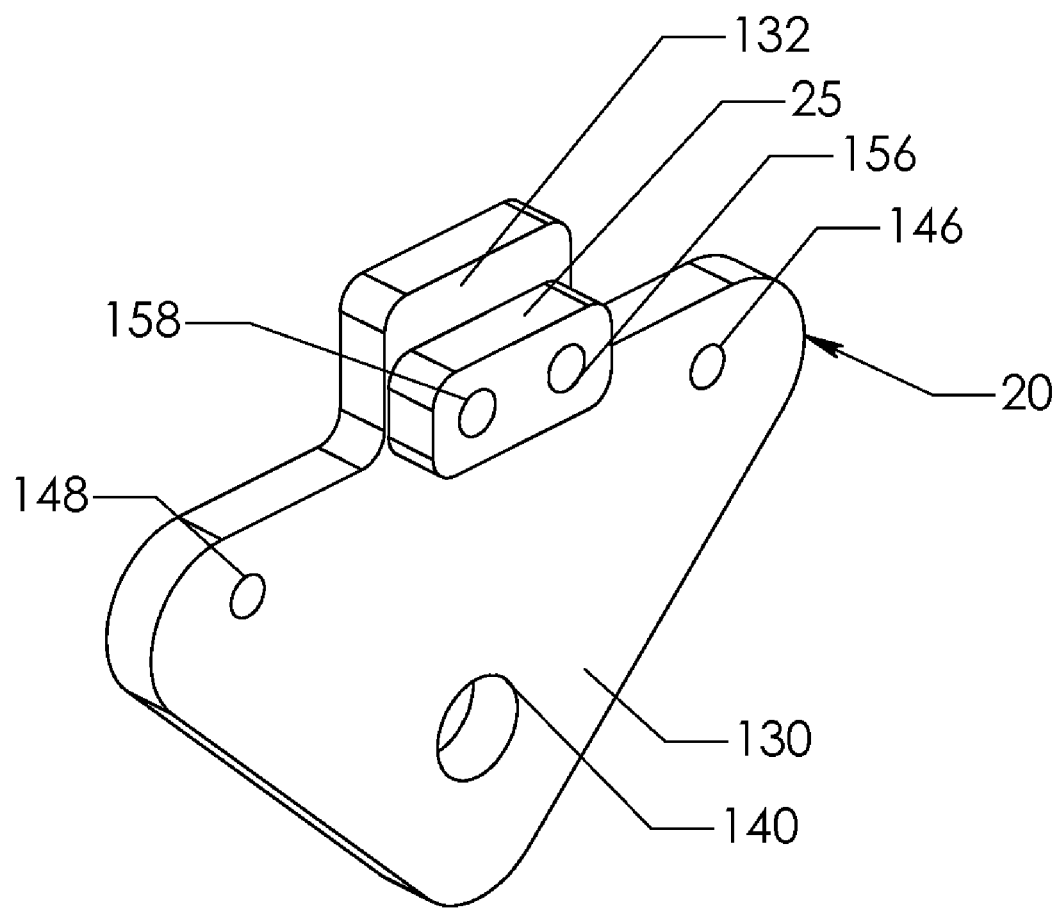
FIG. 6 is a schematic of a metal frame member utilized in the car wash roller assembly of FIG. 1.
Figure 7:
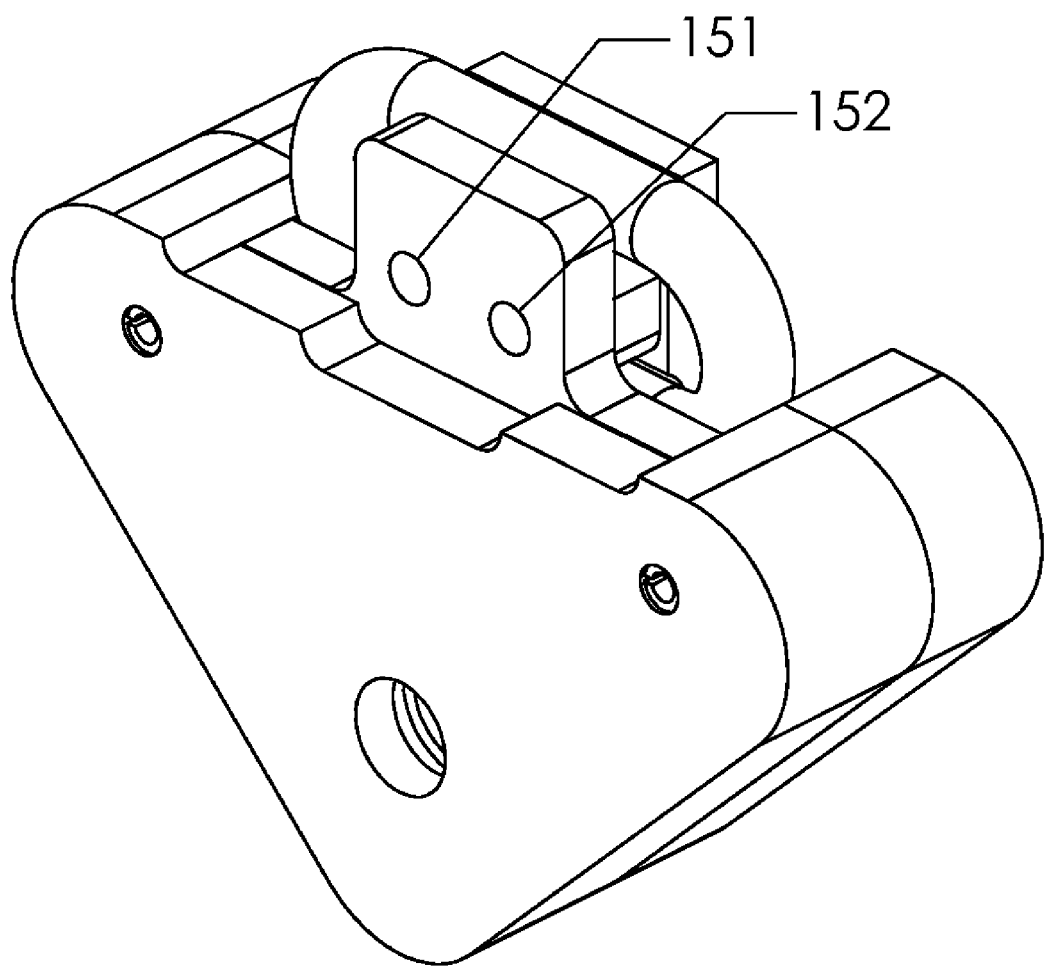
FIG. 7 is a schematic of a subassembly utilized in the car wash roller assembly of FIG. 1.
Figure 8:
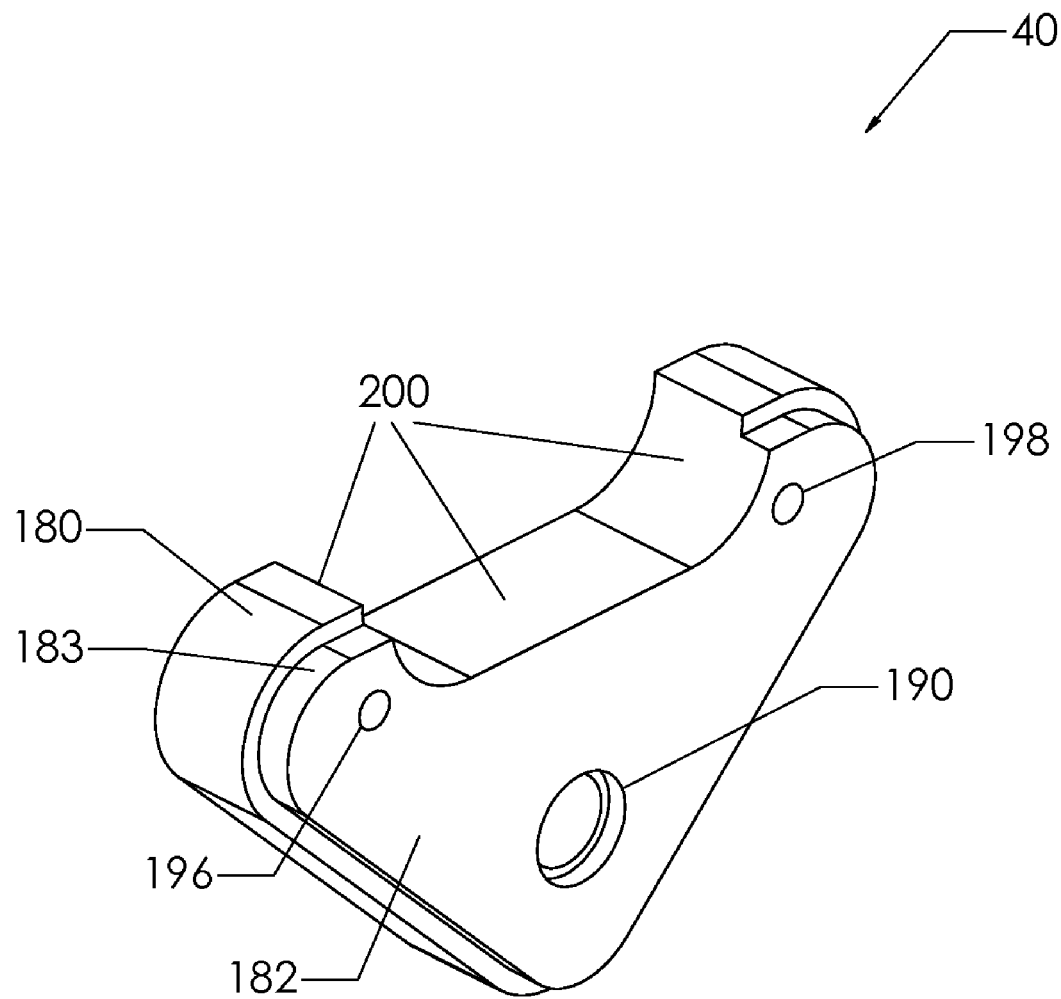
FIG. 8 is a schematic of a first plastic cover member utilized in the car wash roller assembly of FIG. 1.
Figure 9:
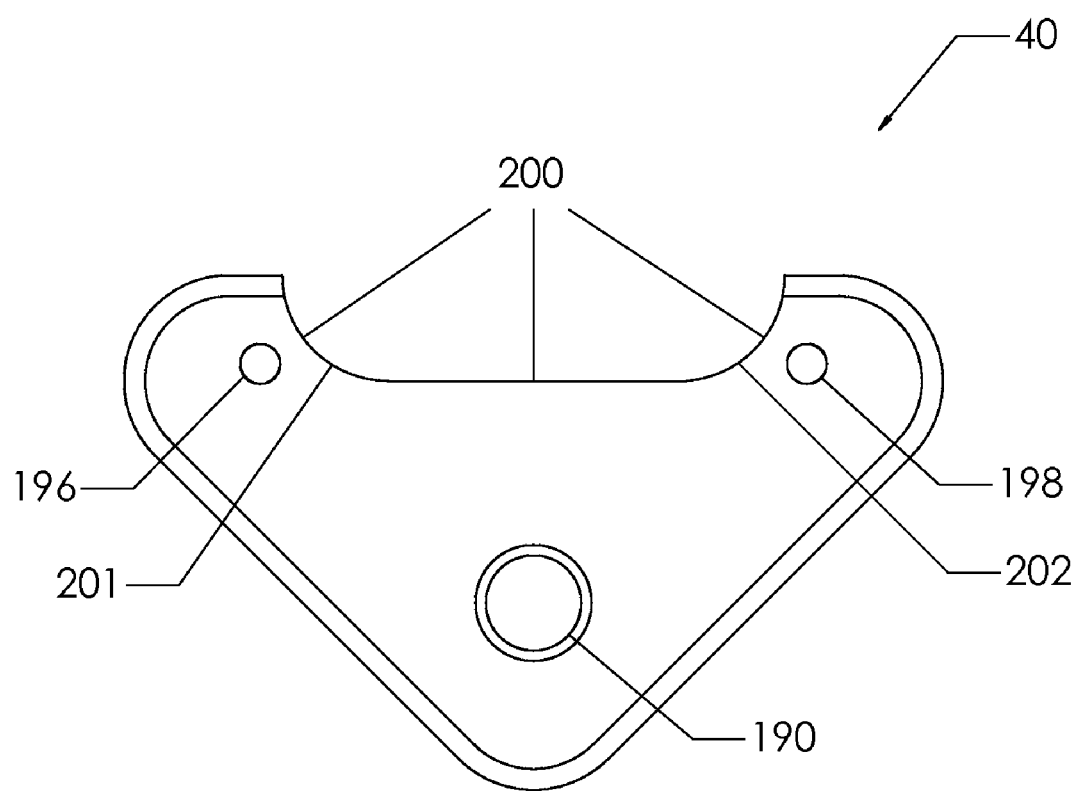
FIG. 9 is a front view of the first plastic cover member of FIG. 8.
Figure 10:
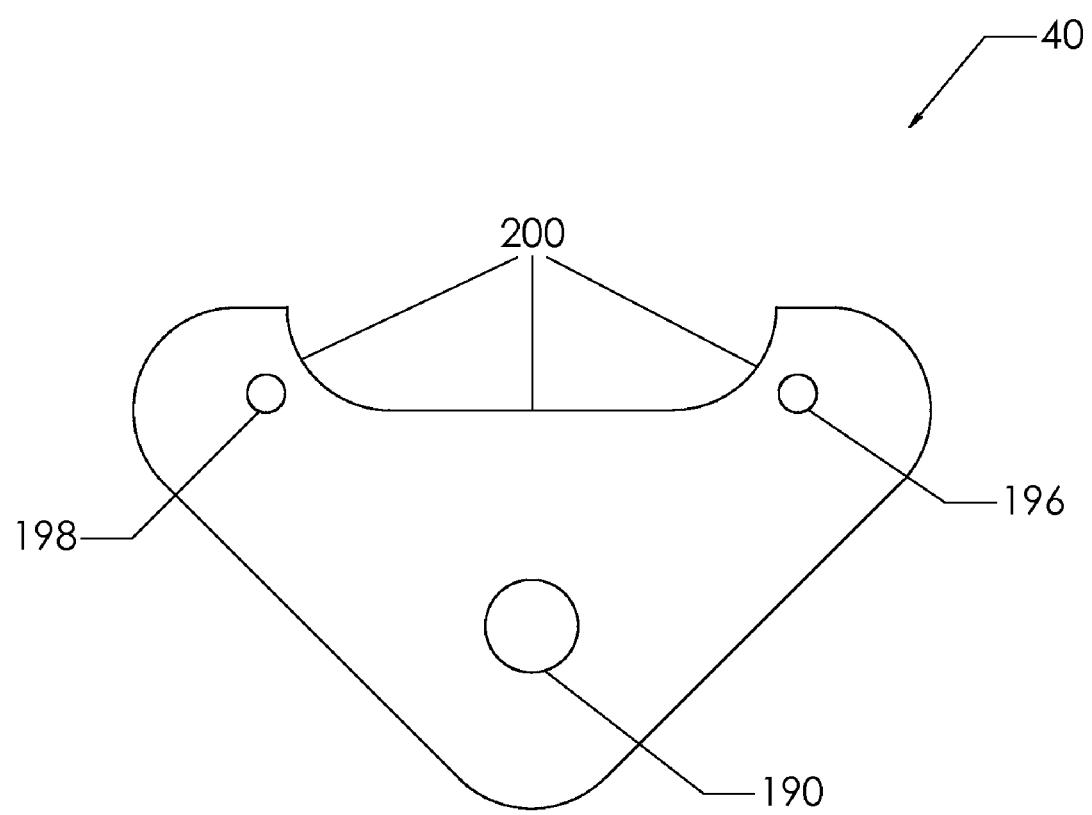
FIG. 10 is a rear view of the first plastic cover member of FIG. 8.
Figure 11:
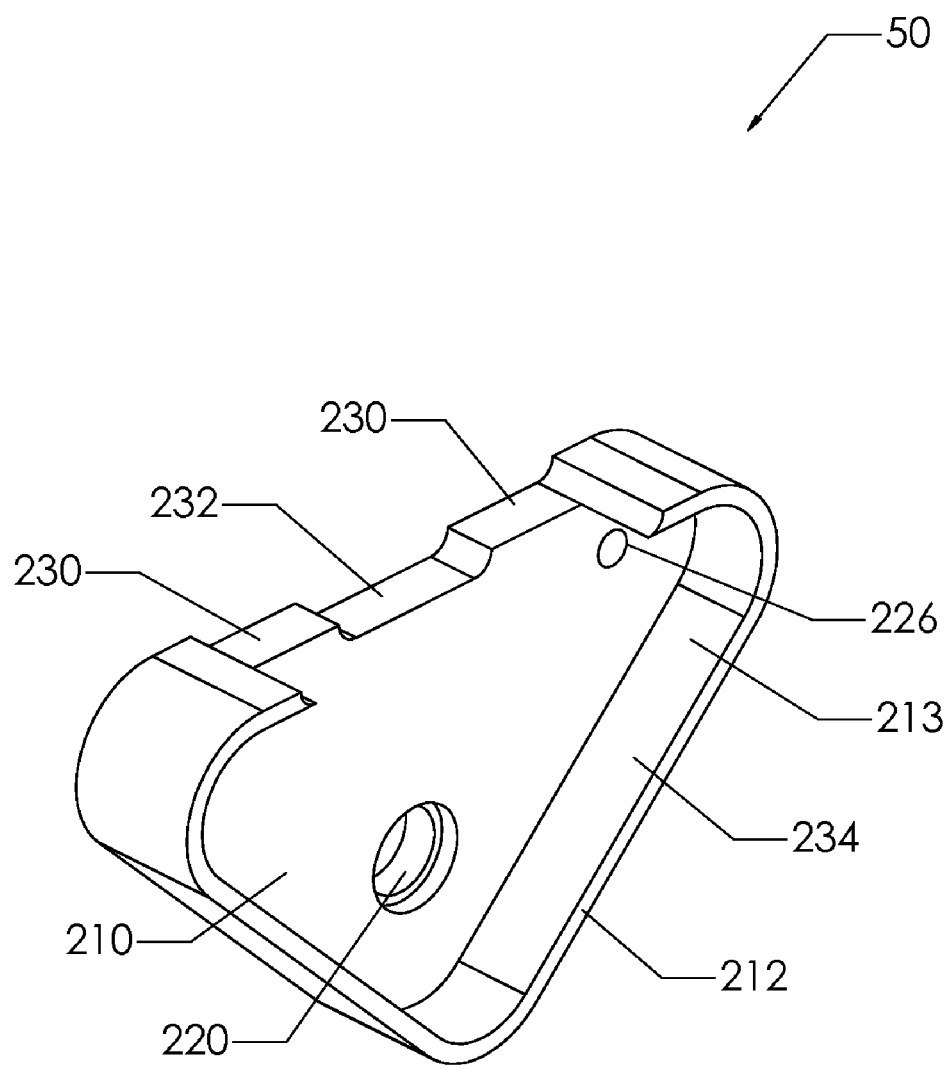
FIG. 11 is a schematic of a second plastic cover member utilized in the car wash roller assembly of FIG. 1.
Figure 12:
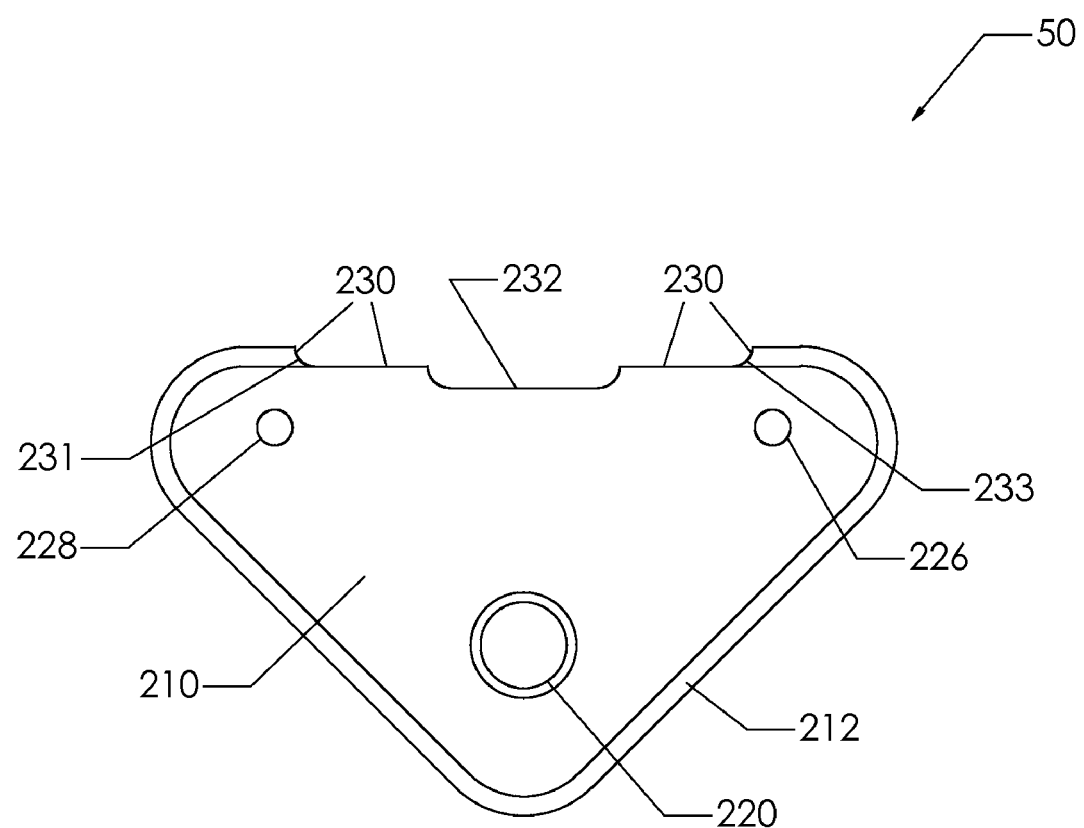
FIG. 12 is a front view of the second plastic cover member of FIG. 11.
Figure 13:
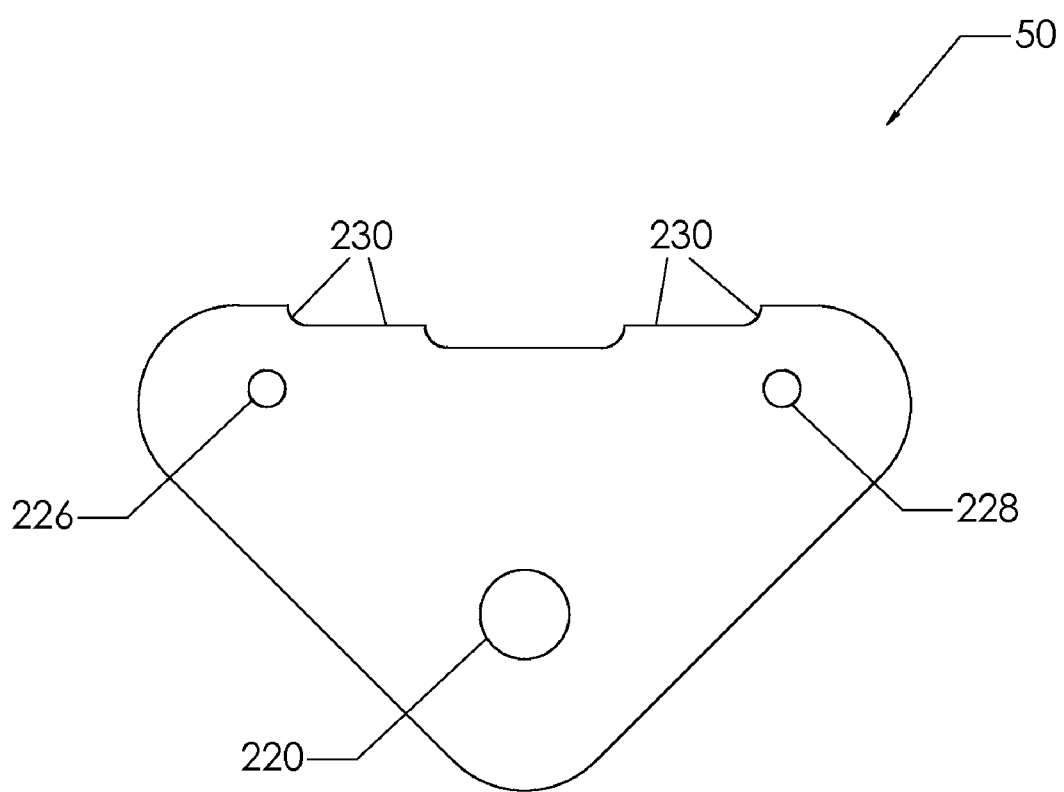
FIG. 13 is a rear view of the second plastic cover member of FIG. 11.
Figure 14:
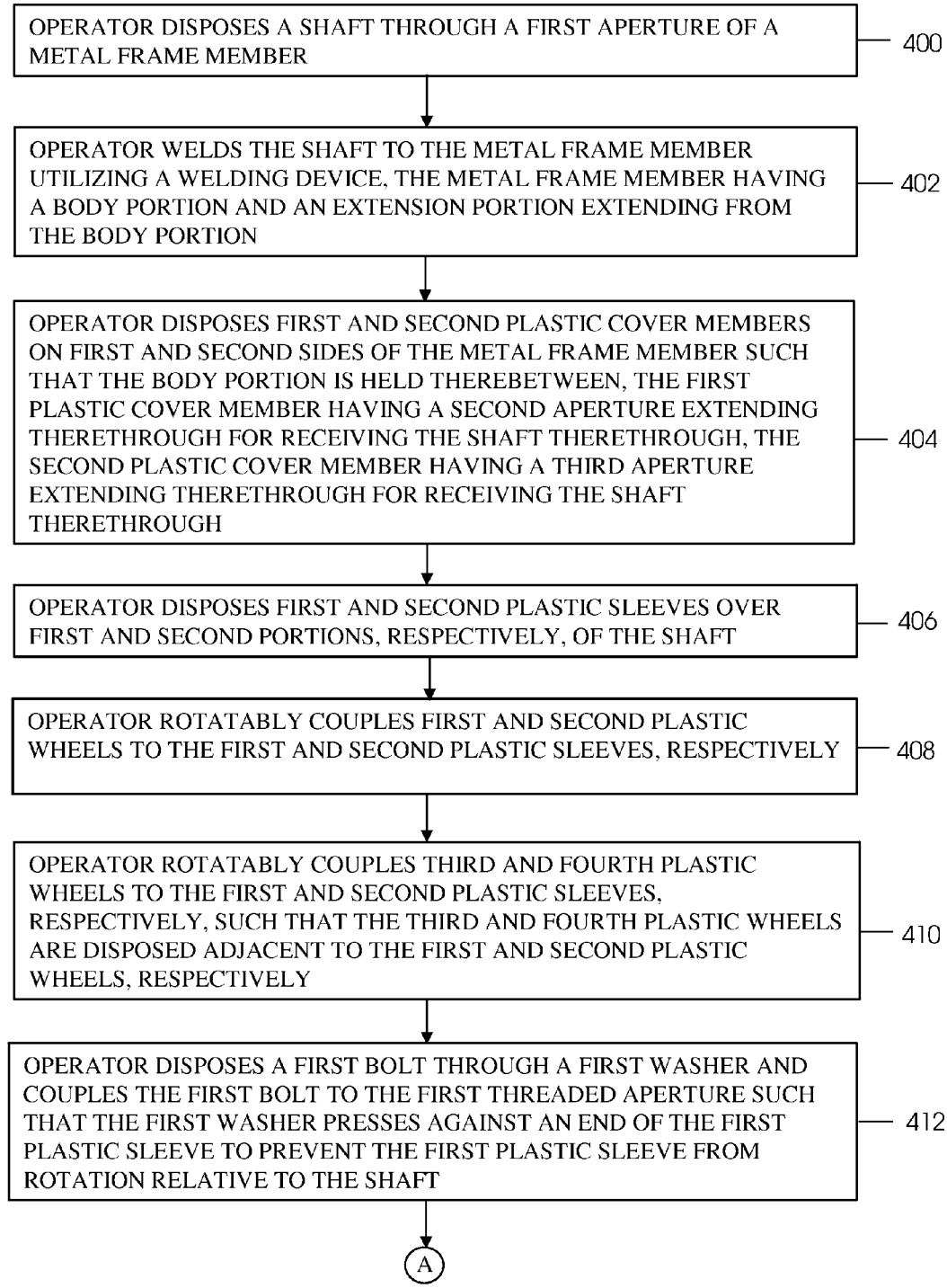
FIGS. 14, 15 and 16 are flowcharts of a method of manufacturing the car wash roller of FIG. 1 in accordance with another exemplary embodiment.
Figure 15:
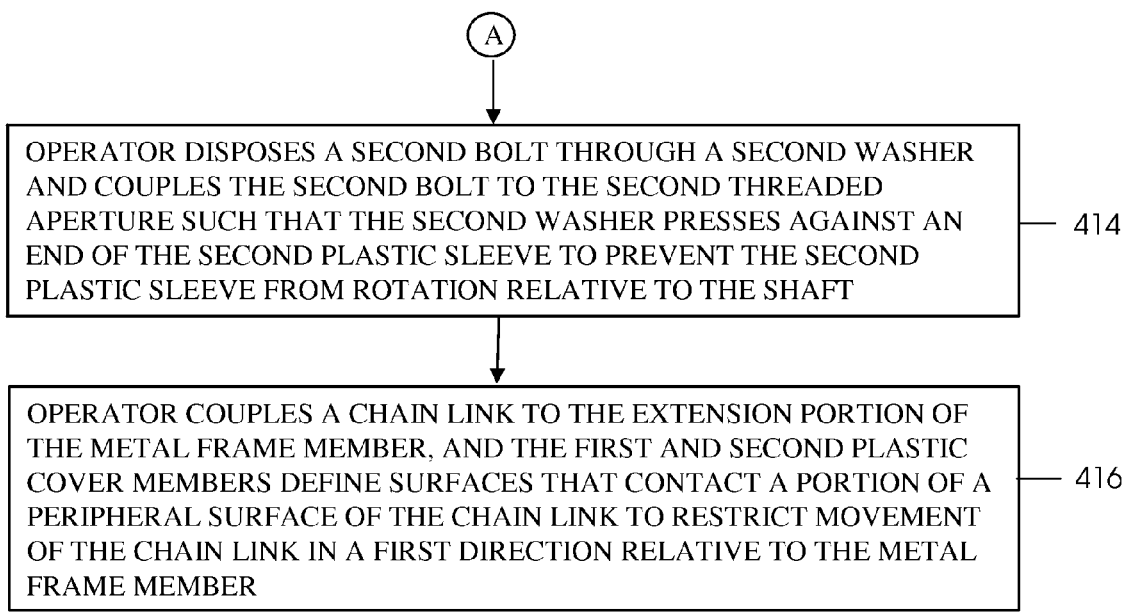

Referring to FIGS. 2, 3 and 5, the shaft 30 is configured to be received through the aperture 140 of the metal frame member 20. In one exemplary embodiment the shaft 30 is constructed of steel. Of course, in alternative embodiments, the shaft 30 could be constructed of other materials known to those skilled in the art. The shaft 30 is welded to the metal frame member 20 utilizing weld joints 173, 174 such that the shaft 30 is fixedly coupled to the metal frame member 20.

Referring to FIGS. 3 and 5, the first and second plastic cover members 40, 50 are configured to hold the body portion 130 of the metal frame member 20 therebetween.

Referring to FIGS. 2, 8, 9 and 10, the first plastic cover member 40 includes a cover portion 180 and an extension portion 182 extending outwardly from the cover portion 180. In one exemplary embodiment, the cover portion 180 is generally triangular-shaped and the extension portion 182 is generally triangular-shaped. The first plastic cover member 40 includes apertures 190, 196, 198 extending therethrough. The aperture 190 is configured to receive the shaft 30 therethrough. The apertures 196, 198 are configured to receive the dowel pins 90, 92, respectively, therethrough. The first plastic cover member 40 defines a constraining surface 200 that has first and second arcuate-shaped portions 201, 202 that constrain movement of the chain link 102 in a first direction 119 and in a second direction 120. In one exemplary embodiment, the first plastic cover member 40 is constructed of ultra high molecular weight (UHMW) plastic. Of course, in alternative embodiments, the first plastic cover member 40 could be constructed of other types of plastics known to those skilled in the art such as polypropylene, PVC, urethane, nylon, acetal, or polytetrafloraeythelyne for example.

Referring to FIGS. 2, 11, 12, and 13, the second plastic cover member 50 includes a cover portion 210 and a peripheral wall 212 extending from the cover portion 210. The cover portion 210 and the peripheral wall 212 define an open region 234 for receiving the metal frame member 20 therein and a portion of the extension portion 182 of the first plastic cover member 40 therein. In one exemplary embodiment, the cover portion 210 is generally triangular-shaped and defines a notch 232 thereon. The second plastic cover member 50 is configured such that a peripheral surface 183 (see FIG. 8) of the extension portion 182 of the first plastic cover member 40 engages an inner surface 213 of the peripheral wall 212 such that the second plastic cover member 50 is press-fit on to the first plastic cover member 40, with the metal frame member 20 sandwiched between the members 40, 50. The cover portion 210 includes apertures 220, 226, 228 extending therethrough. The aperture 220 is aligned with the aperture 140 of the metal frame member 20 and is further aligned with the aperture 190 of the first plastic cover member 40. The aperture 220 is configured to receive the shaft 30 therethrough. The apertures 226, 228 are aligned with the apertures 146, 148, respectively, of the metal frame member and are further aligned with the apertures 190, 196, respectively, of the first plastic cover member 40. The apertures 226, 228 are configured to receive the dowel pins 90, 92, respectively, therethrough. The second plastic cover member 50 defines a constraining surface 230 that has first and second arcuate-shaped portions 231, 233 that constrain movement of the chain link 102 in a first direction 119 and in a second direction 120. In one exemplary embodiment, the second plastic cover member 50 is constructed of UHMW plastic. Of course, in alternative embodiments, the second plastic cover member 50 could be constructed of other types of plastics known to those skilled in the art such as polypropylene, PVC, urethane, nylon, acetal, or polytetrafloraeythelyne for example.

Referring to FIG. 2, the first plastic sleeve 52 is disposed over first portion of the shaft 30. The first plastic sleeve 52 has a length greater than a length of the first portion of the shaft 30 extending outwardly from the metal frame member 20 in a first direction. In one exemplary embodiment, the first plastic sleeve 52 is held in a fixed position on the shaft 30 by the first washer 80 that is urged against an end of the first plastic sleeve 52 by the first bolt 70 that is threadably coupled in a first threaded aperture 170 of the shaft 30. Thus, no rotation of the first plastic sleeve 52 occurs relative to the shaft 30 during operation of the car wash roller assembly 10.

The second plastic sleeve 54 is disposed over second portion of the shaft 30. The second plastic sleeve 54 has a length greater than a length of the second portion of the shaft 30 extending outwardly from the metal frame member 20 in a second direction. In one exemplary embodiment, the second plastic sleeve 54 is held in a fixed position on the shaft 30 by the second washer 82 that is urged against an end of the second plastic sleeve 54 by the second bolt 72 that is threadably coupled in a second threaded aperture 172 of the shaft 30. Thus, no rotation of the second plastic sleeve 54 occurs relative to the shaft 30 during operation of the car wash roller assembly 10.

In one exemplary embodiment, the first and second plastic sleeves 52, 54 are constructed of UHMW plastic. Of course, in alternative embodiments, the first and second plastic sleeves 52, 54 could be constructed of other types of plastics known to those skilled in the art such as polypropylene, PVC, urethane, nylon, acetal, or polytetrafloraeythelyne for example.

The first and second plastic wheels 60, 62 are rotatably coupled to the first and second plastic sleeves 52, 54, respectively. The first and second plastic wheels 60, 62 are also referred as inboard wheels. The first plastic wheel 60 includes a cylindrical body 250 with an aperture 252 extending therethrough for receiving the first plastic sleeve 52 and the shaft 30 therethrough. The cylindrical body 250 further includes an aperture 254 extending therein for receiving a sleeve portion 291 of the third plastic wheel 64 therein. The second plastic wheel 62 includes a cylindrical body 270 with an aperture 272 extending therethrough for receiving the second plastic sleeve 54 and the shaft 30 therethrough. The cylindrical body 270 further includes an aperture 274 extending therein for receiving a sleeve portion 301 of the fourth plastic wheel 66 therein. In one exemplary embodiment, the first and second plastic wheels 60, 62 are constructed of UHMW plastic. Of course, in alternative embodiments, the first and second plastic wheels 60, 62 could be constructed of other types of plastics known to those skilled in the art such as polypropylene, PVC, urethane, nylon, acetal, or polytetrafloraeythelyne for example.

The third and fourth plastic wheels 64, 66 are rotatably coupled to the first and second plastic sleeves 52, 54, respectively, and are disposed adjacent to the first and second plastic wheels 60, 62, respectively. The third and fourth plastic wheels 64, 66 are also referred to as outboard wheels. The third plastic wheel 64 includes a cylindrical body 290 and a sleeve portion 291 extending outwardly from the cylindrical body 290. The third plastic wheel 64 includes an aperture 292 extending therethrough for receiving the shaft 30 and the first plastic sleeve 52 therethrough. The third plastic wheel 64 further includes an aperture 294 extending therein having a larger diameter than the aperture 292, for receiving the first bolt 70 and the first washer 80 therein. The third plastic wheel 64 can rotate independently about the first plastic sleeve 52 relative to the first plastic wheel 60. The fourth plastic wheel 66 includes a cylindrical body 300 and a sleeve portion 301 extending outwardly from the cylindrical body 300. The fourth plastic wheel 66 includes an aperture 302 extending therethrough for receiving the shaft 30 and the second plastic sleeve 54 therethrough. The fourth plastic wheel 66 further includes an aperture 304 extending therein having a larger diameter than the aperture 302, for receiving the second bolt 72 and the second washer 82 therein. The fourth plastic wheel 66 can rotate independently about the second plastic sleeve 54 relative to the second plastic wheel 62. In one exemplary embodiment, the third and fourth plastic wheels 64, 66 are constructed of urethane plastic. An advantage of constructing the third and fourth plastic wheels 64, 66 of urethane plastic, is that the urethane plastic does not degrade steel rails of the car wash conveyor system contacting the third and fourth plastic wheels 64, 66. Of course, in alternative embodiments, the third and fourth plastic wheels 64, 66 could be constructed of other types of plastics known to those skilled in the art such as polypropylene, PVC, UHMW plastic, nylon, acetal, or polytetrafloraeythelyne for example.

Referring to FIGS. 1 and 3, the first and second dowel pins 90, 92 extend through the first plastic cover member 40, the metal frame member 20, and the second plastic cover member 50 to fixedly couple the first plastic cover member 40, the metal frame member 20, and the second plastic cover member 50 together.

Figure 4:
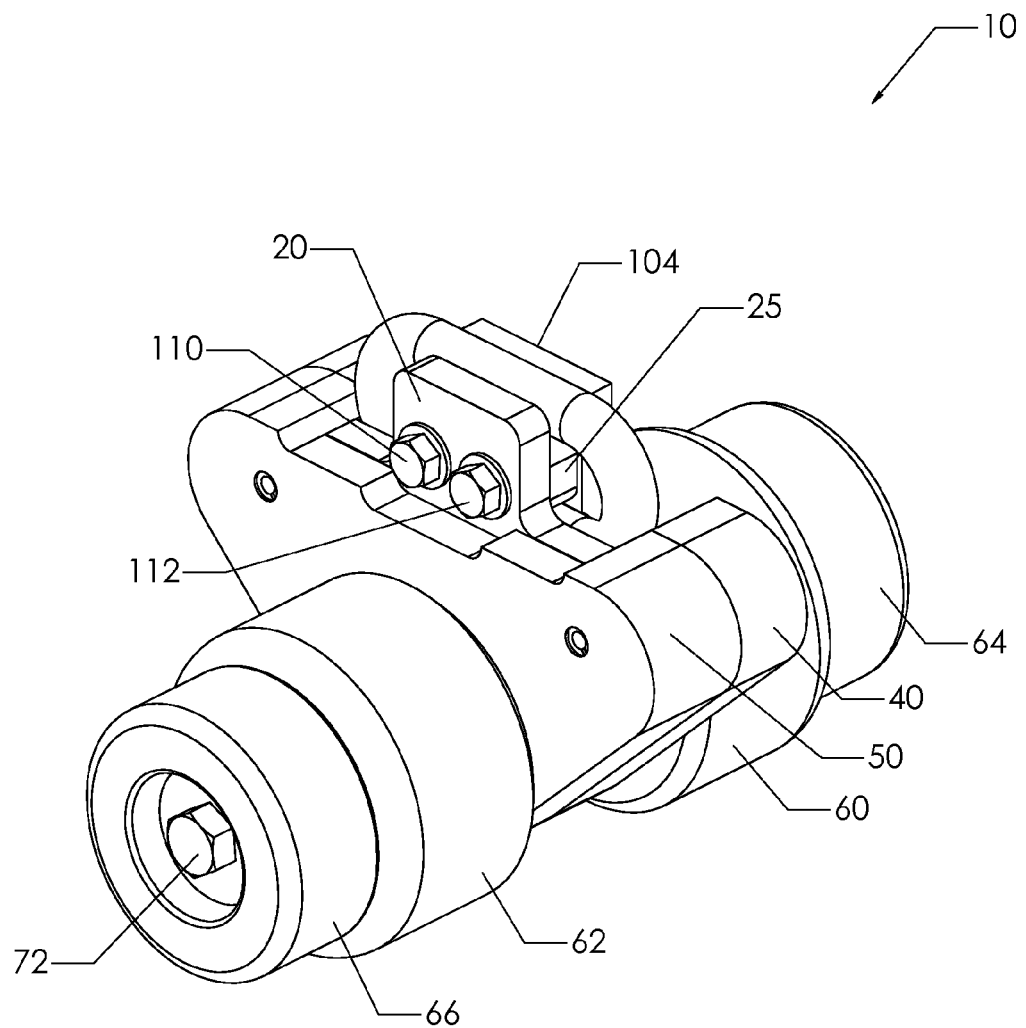
FIG. 4 is another schematic of the car wash roller assembly of FIG. 1.

Referring to FIGS. 1, 3 and 4, the chain link 102 is removably coupled to the extension portion 132 of the metal frame member 20. The chain link 102 defines a central open region 310 for receiving the spacing plate 25 therein. The chain link 102 is further disposed against the metal frame member 20 and is sandwiched between the metal frame member 20 and the back plate 104. The first and second plastic cover members 40, 50 define constraining surfaces 200, 230, respectively, (see FIGS. 8 and 11) that contact a portion of a peripheral surface of the chain link 102 to restrict movement of the chain link 102 in a first direction 119 and in a second direction 120 relative to the metal frame member 20. In one exemplary embodiment, the chain link 102 has a metal elongated ring-shaped body. In an alternative embodiment, the chain link 102 has an elongated ring-shaped body having a portion of the body removed therefrom. Of course, in other alternative embodiments, the chain link 102 could have other structures known to those skilled in art. Also, the chain link 102 could be constructed of other materials known to those skilled in the art.

Referring to FIGS. 1, 3, 4 and 6, the back plate 104 is configured to be disposed on a side of the chain link 102 opposite the metal frame member 20. The back plate 104 is coupled to the spacing plate 25 and the metal frame member 20 such that the spacing plate 25 is disposed within the central open region 310 of the chain link 102 and the chain link 102 is fixedly held between the back plate 104 and the metal frame member 20. The back plate 104 includes apertures 316, 318 extending therethrough that are aligned with the apertures 156, 158, respectively, of the spacing plate 25. The bolt 110 extends through apertures 151, 156, the central open region 310, and the aperture 316 is threadably coupled to the nut 114. The bolt 112 extends through apertures 152, 158, the central open region 310, and the aperture 318 and is threadably coupled to the nut 116. The back plate 104 includes grooves 320, 322 extending therein that are configured to receive portions of the chain link 102 therein.

Referring to FIGS. 1, 2, 3, 14 and 15, a flowchart of a method for manufacturing the car wash roller assembly 10 in accordance with another exemplary embodiment will now be explained.

At step 400, an operator disposes the shaft 30 through the aperture 140 of the metal frame member 20.

At step 402, the operator welds the shaft 30 to the metal frame member 20 utilizing a welding device 249. The metal frame member 20 has the body portion 130 and the extension portion 132 extending from the body portion 130.

At step 404, the operator disposes first and second plastic cover members 40, 50 on first and second sides, respectively, of the metal frame member 20 such that the body portion 130 is held therebetween. The first plastic cover member 40 has the aperture 190 extending therethrough for receiving the shaft 30 therethrough. The second plastic cover member 50 has the aperture 220 extending therethrough for receiving the shaft 30 therethrough.

At step 406, the operator disposes first and second plastic sleeves 52, 54 over first and second portions, respectively, of the shaft 30.

At step 408, the operator rotatably couples the first and second plastic wheels 60, 62 to the first and second plastic sleeves 52, 54, respectively.

At step 410, the operator rotatably couples third and fourth plastic wheels 64, 66 to the first and second plastic sleeves 52, 54, respectively, such that the third and fourth plastic wheels 64, 66 are disposed adjacent to the first and second plastic wheels 60, 62, respectively.

At step 412, the operator disposes the first bolt 70 through the first washer 80 and couples the first bolt 70 to the first threaded aperture 170 such that the first washer 80 presses against an end of the first plastic sleeve 52 to prevent the first plastic sleeve 52 from rotating relative to the shaft 30.

At step 414, the operator disposes the second bolt 72 through the second washer 82 and couples the second bolt 72 to the second threaded aperture 172 such that the second washer 82 presses against an end of the second plastic sleeve 54 to prevent the second plastic sleeve 54 from rotating relative to the shaft 30.

At step 416, the operator couples the chain link 102 to the extension portion 132 of the metal frame member 20, and the first and second plastic cover members 40, 50 define surfaces that contact a portion of a peripheral surface of the chain link 102 to restrict movement of the chain link 102 in a first direction 119 relative to the metal frame member 20.

Figure 16:
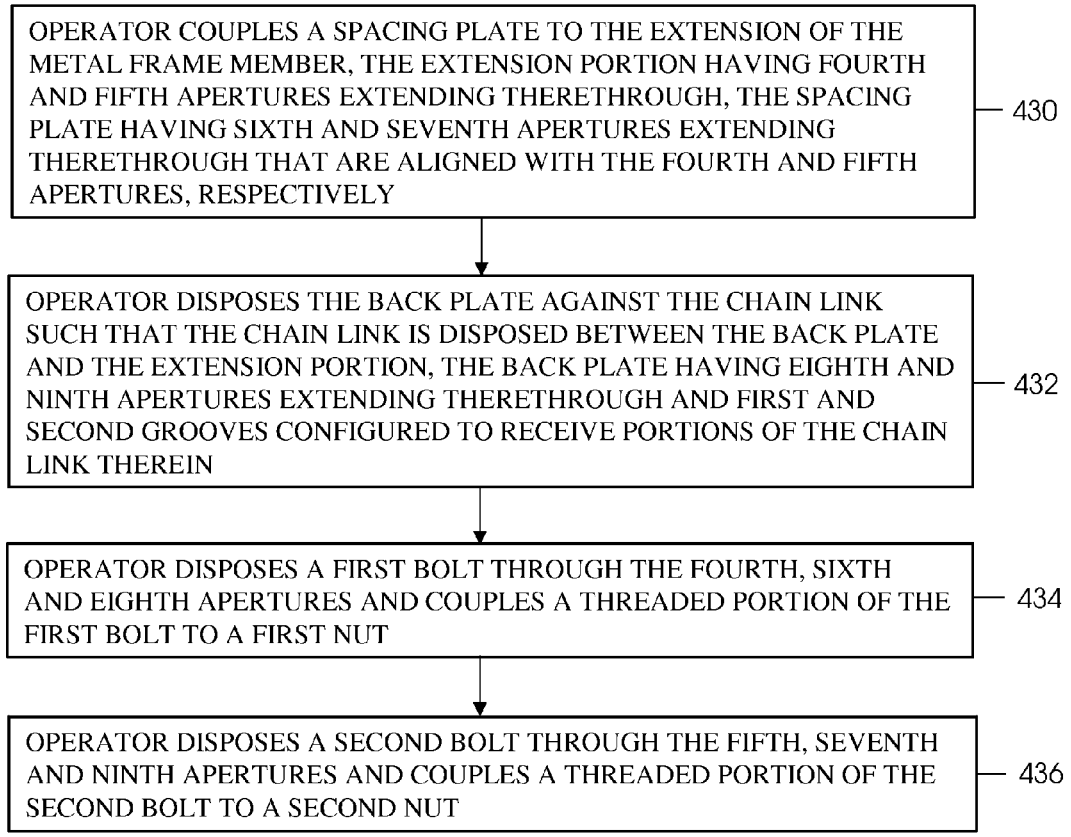

Referring to FIG. 16, a flowchart of a method for implementing the step 416 will now be described.

At step 430, the operator couples the spacing plate 25 to the extension portion 132 of the metal frame member 20. The extension portion 132 has apertures 151, 152 extending therethrough. The spacing plate 25 has apertures 156, 158 extending therethrough that are aligned with the apertures 151, 152, respectively.

At step 432, the operator disposes the back plate 104 against the chain link 102 such that the chain link 102 is disposed between the back plate 104 and the extension portion 132. The back plate 104 has apertures 316, 318 extending therethrough, and grooves 320, 322 configured to receive portions of the chain link 102 therein.

At step 434, the operator disposes the bolt 110 through the apertures 151, 156, 316 and couples a threaded portion of the bolt 110 to the nut 114.

At step 436, the operator disposes the bolt 112 through the apertures 152, 158, 318 and couples a threaded portion of the bolt 112 to the nut 116.

Figures 17, 18:
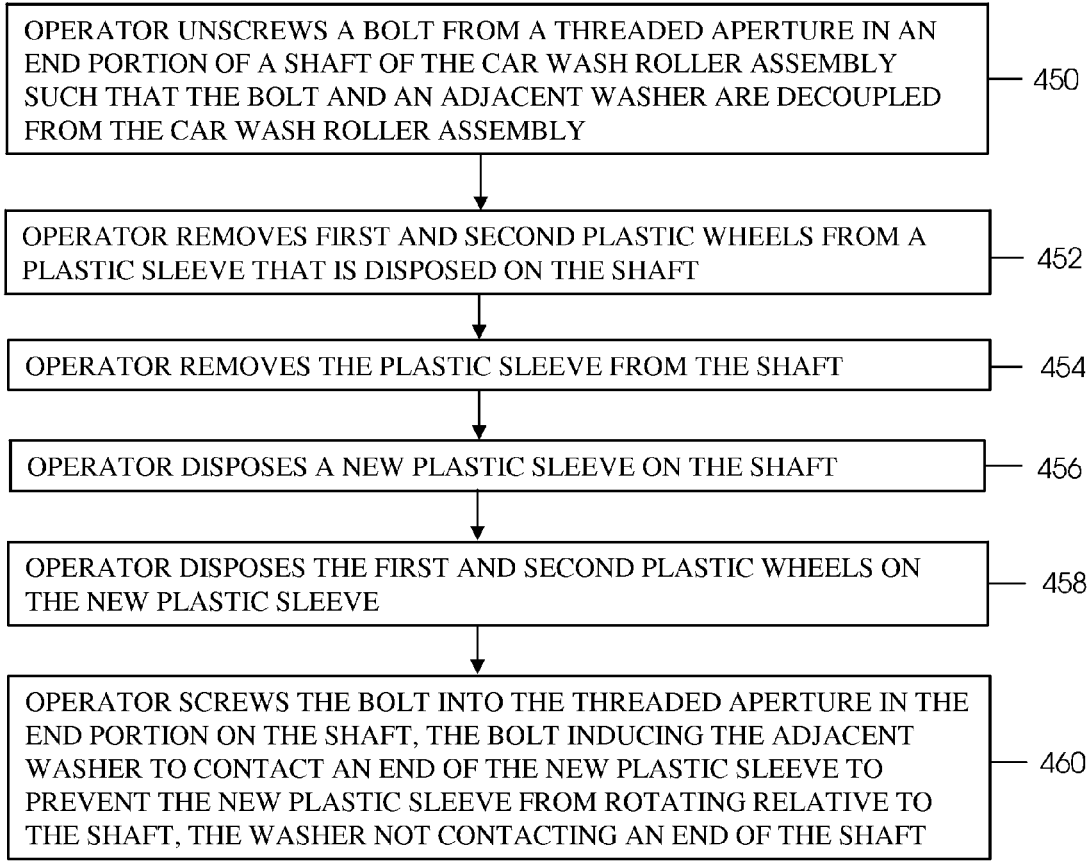
FIG. 17 is a flowchart of a method of replacing a plastic sleeve in the car wash roller assembly of FIG. 1 in accordance with another exemplary embodiment.
FIG. 18 is a block diagram of a welding device.

Referring to FIGS. 2, 5, and 17, a flowchart of a method of replacing the first plastic sleeve 52 in the car wash roller assembly 10 in accordance with another exemplary embodiment will now be explained.

At step 450, the operator unscrews the bolt 70 from in the first threaded aperture 170 in an end portion of a shaft 30 of the car wash roller assembly 10 such that the bolt 70 and the adjacent washer 80 are decoupled from the car wash roller assembly 10.

At step 452, the operator removes plastic wheels 60, 64 from the first plastic sleeve 52 that is disposed on the shaft 30.

At step 454, the operator removes the first plastic sleeve 52 from the shaft 30.

At step 456, the operator disposes a new plastic sleeve 52 on the shaft 30.

At step 458, the operator disposes the plastic wheels 60, 64 on the new plastic sleeve 52.

At step 460, the operator screws the bolt 70 into the first threaded aperture 170 in the end portion of the shaft 30. The bolt 70 induces the adjacent washer 80 to contact an end of the new plastic sleeve 52 to prevent the new plastic sleeve 52 from rotating relative to the shaft 30. The washer 80 does not contact an end of the shaft 30.

The car wash roller assembly 10 and the method of manufacturing the car wash roller assembly 10 provide a substantial advantage over other assemblies and methods. In particular, the car wash roller assembly 10 and the method of manufacturing the assembly 10 provide a technical effect of utilizing first and second plastic cover members to define surfaces that restrict movement of a chain link in a first direction relative to a metal frame member. As a result, an operational life of the car wash roller assembly is increased.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A car wash roller assembly for attachment to a chain link of a car wash conveyor system, comprising:
a metal frame member having a body portion and an extension portion extending from the body portion, the body portion having a first aperture extending therethrough;
a shaft configured to be disposed through the first aperture, the shaft being coupled to the metal frame member;
first and second plastic cover members configured to hold the body portion of the metal frame member therebetween such that the extension portion extends outwardly from the first and second plastic cover members, the first plastic cover member having a second aperture extending therethrough for receiving the shaft therethrough, the second plastic cover member having a third aperture extending therethrough for receiving the shaft therethrough;
first and second plastic sleeves that are disposed over first and second portions, respectively of the shaft;
first and second plastic wheels that are rotatably coupled to the first and second plastic sleeves, respectively; and
the extension portion of the metal frame member configured to be coupled to the chain link, and the first plastic cover member defines a surface configured to contact a portion of a peripheral surface of the chain link to restrict movement of the chain link in a first direction relative to the metal frame member.

2. The car wash roller assembly of claim 1, further comprising:
a spacing plate coupled to a side surface of the extension portion; and
a back plate configured to be coupled to the spacing plate such that the spacing plate is disposed within a central open region of the chain link and the chain link is fixedly held between the back plate and the body portion of the metal frame member.

3. The car wash roller assembly of claim 2, wherein:
the extension portion of the metal frame member having fourth and fifth apertures extending therethrough;
the spacing plate having sixth and seventh apertures extending therethrough that are aligned with the fourth and fifth apertures, respectively; and
the back plate having first and second grooves configured to receive portions of the chain link therein; the assembly further comprising:
a first bolt disposed through the fourth and sixth apertures and coupled to a first nut; and
a second bolt disposed through the fifth and seventh apertures and coupled to a second nut.

4. The car wash roller assembly of claim 1, further comprising:
third and fourth plastic wheels that are rotatably coupled to the first and second plastic sleeves, respectively, that are disposed adjacent to the first and second plastic wheels, respectively.

5. The car wash roller assembly of claim 4, wherein the first and second plastic wheels are constructed of UHMW plastic, and the third and fourth plastic wheels are constructed of urethane plastic.

6. The car wash roller assembly of claim 4, wherein the first plastic sleeve has a longitudinal length greater than a longitudinal length of the first portion of the shaft, the shaft having first and second threaded apertures extending into first and second end portions, respectively, of the shaft; the assembly further comprising:
- a first bolt configured to be disposed through a first washer and coupled to the first threaded aperture such that the first washer presses against an end of the first plastic sleeve to prevent the first plastic sleeve from rotating relative to the shaft; and
- a second bolt configured to be disposed through a second washer and coupled to the second threaded aperture such that the second washer presses against an end of the second plastic sleeve to prevent the second plastic sleeve from rotating relative to the shaft.

7. A method of manufacturing a car wash roller assembly, comprising:
- disposing a shaft through a first aperture of a metal frame member;
- welding the shaft to the metal frame member utilizing a welding device, the metal frame member having a body portion and an extension portion extending from the body portion;
- disposing first and second plastic cover members on first and second sides, respectively, of the metal frame member such that the body portion is held therebetween and the extension portion extends outwardly from the first and second plastic cover members, the first plastic cover member having a second aperture extending therethrough for receiving the shaft therethrough, the second plastic cover member having a third aperture extending therethrough for receiving the shaft therethrough;
- disposing first and second plastic sleeves over first and second portions, respectively, of the shaft; and
- rotatably coupling first and second plastic wheels to the first and second plastic sleeves, respectively.

8. The method of claim 7, further comprising coupling a chain link to the extension portion of the metal frame member, and the first plastic cover member defining a surface that contacts a portion of a peripheral surface of the chain link to restrict movement of the chain link in a first direction relative to the metal frame member.

9. The method of claim 8, wherein the extension portion of the metal frame member has fourth and fifth apertures extending therethrough, and wherein coupling the chain link to the extension portion comprises:
- coupling a spacing plate to the extension portion, the spacing plate having sixth and seventh apertures extending therethrough that are aligned with the fourth and fifth apertures, respectively; and
- disposing the back plate against the chain link such that the chain link is disposed between the back plate and the extension portion, the back plate having first and second grooves configured to receive portions of the chain link therein;
- disposing a first bolt through the fourth and sixth apertures and coupling a threaded portion of the first bolt to a first nut; and
- disposing a second bolt through the fifth and seventh apertures and coupling a threaded portion of the second bolt to a second nut.

10. The method of claim 7, further comprising:
- rotatably coupling third and fourth plastic wheels to the first and second plastic sleeves, respectively, such that the third and fourth plastic wheels are disposed adjacent to the first and second plastic wheels, respectively.

11. The method of claim 10, wherein the first plastic sleeve has a longitudinal length greater than a longitudinal length of the first portion of the shaft, the shaft having first and second threaded apertures extending into first and second end portions, respectively, of the shaft; the method further comprising:
- disposing a first bolt through a first washer and coupling the first bolt to the first threaded aperture such that the first washer presses against an end of the first plastic sleeve to prevent the first plastic sleeve from rotating relative to the shaft; and
- disposing a second bolt through a second washer and coupling the second bolt to the second threaded aperture such that the second washer presses against an end of the second plastic sleeve to prevent the second plastic sleeve from rotating relative to the shaft.

12. A method of replacing a plastic sleeve in a car wash roller assembly, comprising:
- unscrewing a bolt from a threaded aperture in an end portion of a shaft of the car wash roller assembly such that the bolt and an adjacent washer are decoupled from the car wash roller assembly;
- removing first and second plastic wheels from a plastic sleeve that is disposed on the shaft;
- disposing the plastic sleeve off of the shaft;
- disposing a new plastic sleeve on the shaft;
- disposing the first and second plastic wheels on the new plastic sleeve; and
- screwing the bolt into the threaded aperture in the end portion of the shaft such that the adjacent washer contacts an end of the new plastic sleeve and does not contact an end of the shaft such that the new plastic sleeve is prevented from rotating relative to the shaft.

* * * * *